United States Patent
George et al.

(10) Patent No.: US 8,471,888 B2
(45) Date of Patent: Jun. 25, 2013

(54) METHODS AND SYSTEMS FOR MOBILE TELEPRESENCE

(75) Inventors: Richard John George, Waterloo (CA); Brian Alexander Oliver, Fergus (CA)

(73) Assignee: Research In Motion Limited, Waterloo (CA)

( * ) Notice: Subject to any disclaimer, the term of this patent is extended or adjusted under 35 U.S.C. 154(b) by 682 days.

(21) Appl. No.: 12/636,270

(22) Filed: Dec. 11, 2009

(65) Prior Publication Data

US 2011/0032324 A1 Feb. 10, 2011

Related U.S. Application Data

(60) Provisional application No. 61/232,256, filed on Aug. 7, 2009.

(51) Int. Cl.
| | |
|---|---|
| *H04M 3/42* | (2006.01) |
| *H04L 12/16* | (2006.01) |
| *H04N 7/15* | (2006.01) |
| *H04B 7/00* | (2006.01) |
| *G06F 15/16* | (2006.01) |

(52) U.S. Cl.
USPC ............ 348/14.02; 345/161; 348/14.01; 348/14.08; 348/14.16; 348/121; 348/742; 370/260; 370/401; 379/93.21; 381/92; 704/3; 706/11; 709/204; 709/206; 709/221; 709/227; 715/701; 715/753; 715/757

(58) Field of Classification Search
USPC ............ 348/14.02, 14.03, 14.08, 14.12, 121; 348/14.01, 14.09, 14.16, 742; 370/401, 260; 455/508, 416; 704/3; 706/11; 709/204, 227, 709/206, 221; 715/1.1, 701, 753, 757; 345/161; 379/93.21; 381/92
See application file for complete search history.

(56) References Cited

U.S. PATENT DOCUMENTS

| | | | | |
|---|---|---|---|---|
| 5,764,639 A | * | 6/1998 | Staples et al. | ................. 370/401 |
| 6,573,912 B1 | * | 6/2003 | Suzuki et al. | ................. 715/757 |
| 6,958,746 B1 | * | 10/2005 | Anderson et al. | ............. 345/161 |
| 7,184,559 B2 | * | 2/2007 | Jouppi | ........................... 381/92 |

(Continued)

FOREIGN PATENT DOCUMENTS

WO 2005069108 A1 7/2005

OTHER PUBLICATIONS

A-N Moldovan et al: "Personalization of the multimedia content delivered to mobile device users" Broadband Multimedia Systems and Broadcasting, 2009. BMSB '09. IEEE International Symposium on, IEEE, Piscataway, NJ, USA, pp. 1-6 ISBN: 978-1-4244-2590-7. EP09178987.5—Search Report(Mar. 10, 2010).

(Continued)

*Primary Examiner* — Gerald Gauthier
(74) *Attorney, Agent, or Firm* — Novak Druce Connolly Bove + Quigg LLP

(57) ABSTRACT

Exemplary methods and systems relate to telepresence at mobile devices. Aspects comprise dynamic configuration of video provided from a server that intermediates between a mobile device and a telepresence system during a telepresence session. The server receives high definition video from the telepresence system and transcodes into a format that can indicated by the mobile device. The mobile device can dynamically update the format in response to real-time battery life and network interface status. A progressive reduction in bandwidth and power consumptive activities can be implemented. The device can implement face detection and face centering, front/back mobile device camera switching, and automatic contrast control and other video quality controls in an outgoing video stream.

24 Claims, 9 Drawing Sheets

U.S. PATENT DOCUMENTS

| | | | |
|---|---|---|---|
| 7,190,392 B1 * | 3/2007 | Maguire, Jr. | 348/121 |
| 7,333,156 B2 * | 2/2008 | Primeau | 348/742 |
| 7,539,504 B2 * | 5/2009 | Ruef et al. | 455/508 |
| 7,729,299 B2 * | 6/2010 | Eisenberg et al. | 370/260 |
| 7,797,168 B2 * | 9/2010 | Kusumoto et al. | 705/1.1 |
| 7,949,616 B2 * | 5/2011 | Levy et al. | 706/11 |
| 8,072,479 B2 * | 12/2011 | Valliath et al. | 348/14.01 |
| 8,095,120 B1 * | 1/2012 | Blair et al. | 455/416 |
| 8,130,256 B2 * | 3/2012 | Trachtenberg et al. | 348/14.08 |
| 8,199,185 B2 * | 6/2012 | McNelley et al. | 348/14.16 |
| 8,208,007 B2 * | 6/2012 | White | 348/14.16 |
| 8,264,519 B2 * | 9/2012 | Lunde et al. | 348/14.09 |
| 8,300,078 B2 * | 10/2012 | Lovhaugen et al. | 348/14.03 |
| 8,300,785 B2 * | 10/2012 | White | 379/93.21 |
| 2003/0074674 A1 | 4/2003 | Magliaro | |
| 2005/0278446 A1 * | 12/2005 | Bryant | 709/227 |
| 2007/0061398 A1 | 3/2007 | Forssell | |
| 2010/0073454 A1 * | 3/2010 | Lovhaugen et al. | 348/14.03 |
| 2010/0198579 A1 * | 8/2010 | Cunnington et al. | 704/3 |
| 2010/0228825 A1 * | 9/2010 | Hegde et al. | 709/204 |
| 2010/0245536 A1 * | 9/2010 | Huitema et al. | 348/14.08 |
| 2010/0262664 A1 * | 10/2010 | Brown et al. | 709/206 |
| 2010/0306647 A1 * | 12/2010 | Zhang et al. | 715/701 |
| 2010/0306670 A1 * | 12/2010 | Quinn et al. | 715/753 |
| 2010/0321465 A1 * | 12/2010 | Behrens | 348/14.02 |
| 2011/0032324 A1 * | 2/2011 | George et al. | 348/14.12 |
| 2011/0173305 A1 * | 7/2011 | Matuszewski | 709/221 |

OTHER PUBLICATIONS

Extended European Search report mailed Mar. 10, 2010, in corresponding European patent application No. 09178987.5.

A-N Moldovan et al. "Personalisation of the multimedia content delivered to mobile device users" Broadband multimedia systems and broadcasting, 2009. BMSB'09. IEEE, Piscataways, NJ, USA, May 13, 2009, pp. 1-6, XP031480102 ISBN: 978-1-4244-2590-7. *The whole document*.

Dolcourt, Jessica—iVisit Mobile 4.0 User Guide. Host a video conferencing party on your phone http://www.ivisit.com/solutions/beta_letter_1.html; http://reviews.cnet.com/8301-12261_7-9911412-51.html. Posted on Apr. 3, 2008.

Richardson, Texas—damaka Launches Video Conference on iPhone & iTouch Devices. http://www.prweb.com/releases/2009/07/prweb2619554.htm. Posted on Jul. 9, 2009.

Examination Report mailed on Aug. 9, 2011, in corresponding European patent application No. 09178987.5.

Examination Report mailed on May 8, 2012, in corresponding European patent application No. 09178987.5.

Examination Report mailed on Nov. 17, 2010, in corresponding European patent application No. 09178987.5.

Examination Report mailed Dec. 10, 2012, in corresponding European patent application No. 09178987.5.

Office Action mailed Jan. 17, 2013, in corresponding Canadian patent application No. 2,712,409.

* cited by examiner

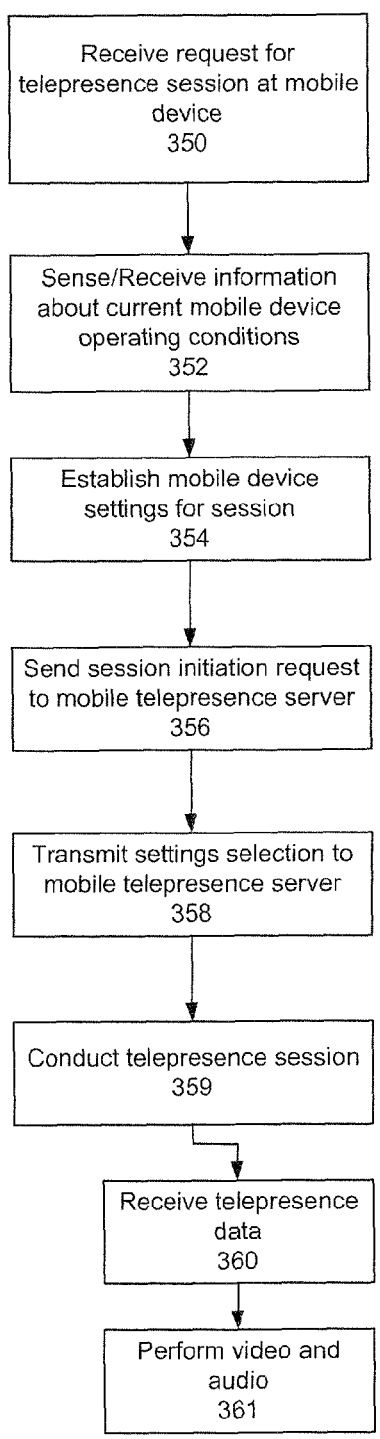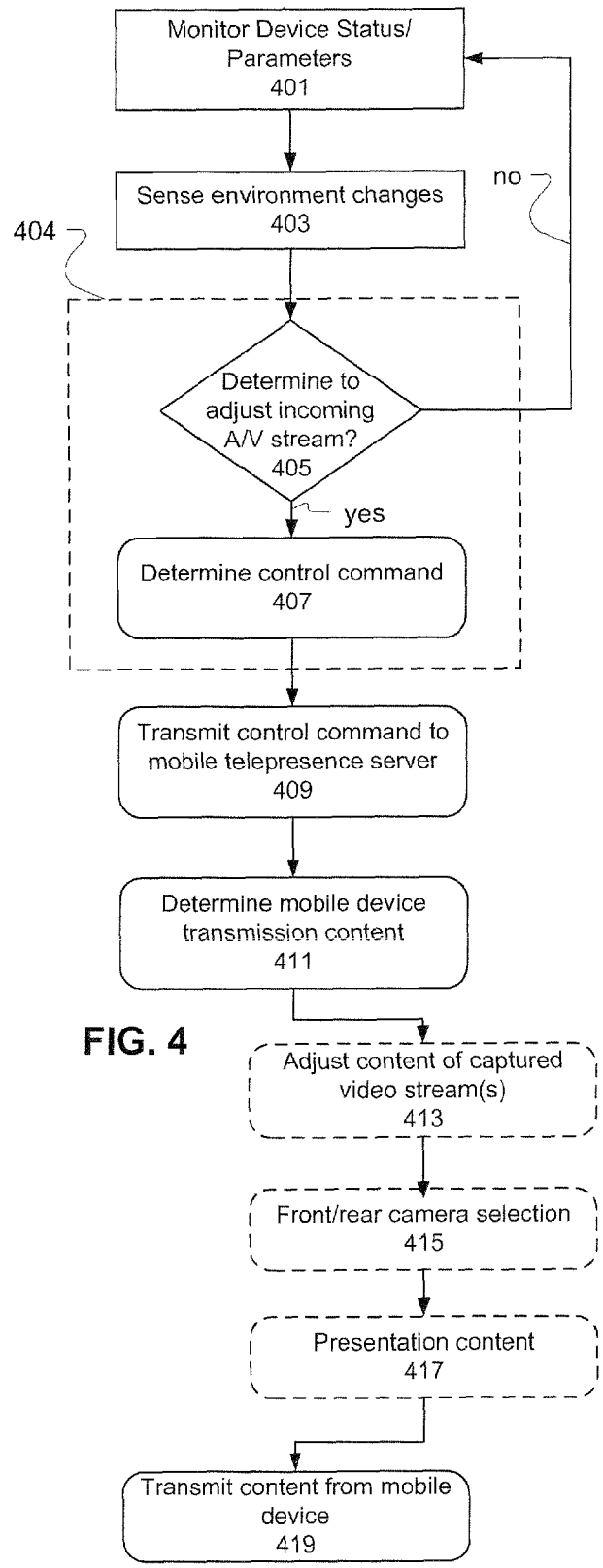

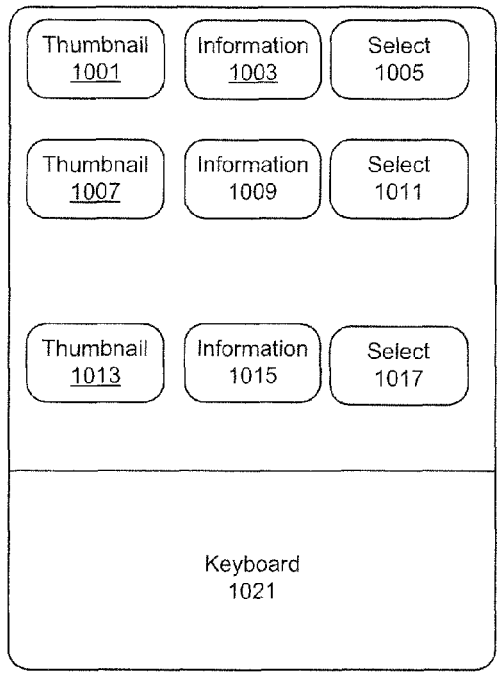
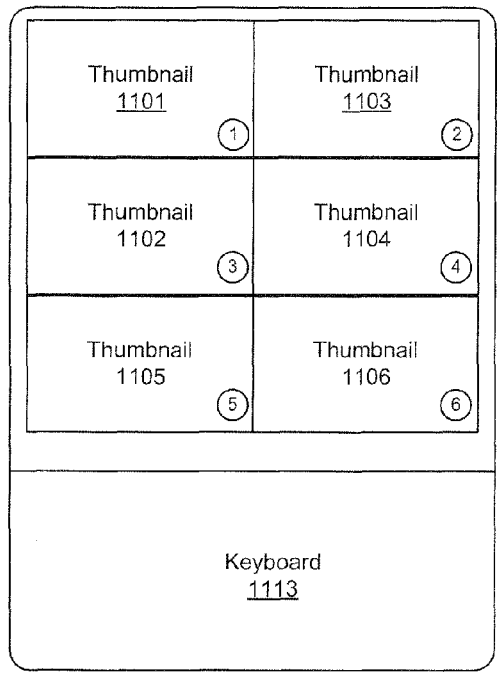
FIG. 10
FIG. 11
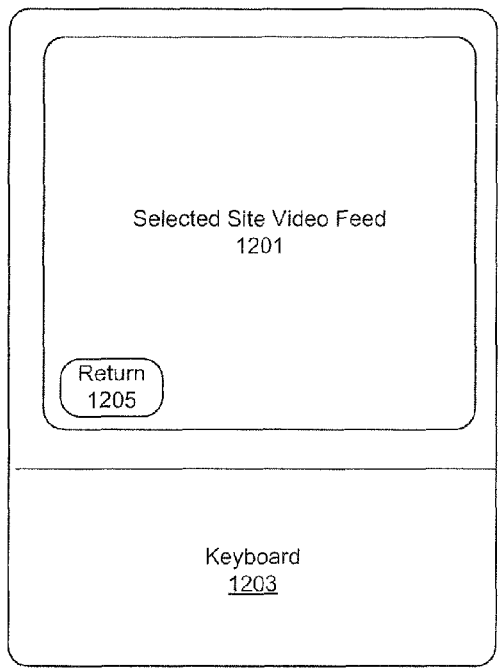
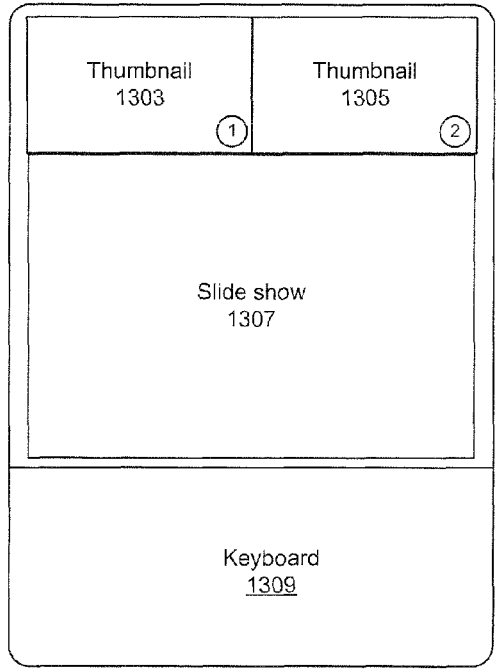
FIG. 12
FIG. 13

METHODS AND SYSTEMS FOR MOBILE TELEPRESENCE

CROSS REFERENCE TO RELATED APPLICATIONS

The present application claims priority benefit to U.S. Provisional Application No. 61/232,256, filed 7 Aug. 2009, which application is expressly incorporated by reference herein in its entirety.

BACKGROUND

1. Field

The following relates to data-enabled mobile devices, such as data-enabled mobile phones, digital assistants, smartphones, and more particularly to enabling telepresence on mobile devices.

2. Related Art

Telepresence uses high quality video and audio to enable virtual gatherings. Telepresence typically relies on very high bandwidth connections between fixed points, such as between two telepresence studios. Each telepresence studio is often carefully designed to provide a high quality experience, including carefully controlling for acoustic effects, and lighting. High quality displays, such as full 1080p displays, are provided, as well as high-definition cameras that include features such as auto-focusing on a current speaker, and switching of a video stream for such focus.

Providing a telepresence experience on a mobile device would be desirable, but remains challenging because of various differences between an environment in which a mobile device operates and the typical telepresence installation.

BRIEF DESCRIPTION OF THE DRAWINGS

Embodiments of the present application will now be described, by way of example only, with reference to the attached Figures, wherein:

FIG 3 depicts a method for initiating a telepresence session;

FIG 4 depicts a device method for dynamically adjusting a telepresence session based on conditions such as battery status and network status;

FIGS. 10-13 depict example mobile device display organizations that can be implemented by video streams sent from the server to the mobile device;

DESCRIPTION

The following description provides examples and other disclosure, which teach those of ordinary skill in the art how to practice implementations and embodiments of the present disclosure. As such, the description is not limiting, but rather is exemplary.

For convenience, in this description, the term "mobile device" is generally used to refer to any portable or mobile network-enabled device that has capabilities comparatively limited to a state of the art non-mobile network-enabled device. Categories of mobile devices include smartphones, netbooks, cellular phones, and laptops. Each of these categories is more limited in one or more types of capability, than a wired desktop computer, or an installation of computers provided at a fixed site. For example, smartphones, cellular phones and netbooks typically have limited, smaller sized, and lower resolution displays. All these devices are intended to run on batteries, and therefore, power consumption is an important consideration. All these devices include a wireless communication capability, and in some cases, wireless communication is a primary or only means of communication for such a device. Wireless communications are often less reliable, more variable, and lower bandwidth than a wired connection. Smartphones and cell phones typically also are held while being used, rather than being placed on a surface. Smartphones and cell phones also typically have reduced size keyboards, no keyboard, and possibly a touch screen for receiving input.

Such example differences between these types of devices and equipment used in a typical telepresence installation calls for enabling telepresence on these types of devices by implementing features, and techniques described herein. Such features and techniques can be implemented in systems, which can operate according to methods described herein. In some aspects, a desired composition of telepresence session data is determined at a mobile device, and provided to a remote server that assembles the telepresence session data according to this desired composition. The desired composition can include a specified composition of video streams available at the remote server, which pertain to the telepresence session in which the remote device participates. Thus, the telepresence session data sent to the mobile device can comprise a video stream. The video stream, as explained herein, can be formed from one or more video streams available at the server. The server can make a composite video stream by reducing resolutions of the input streams according to a specified display resolution of the remote device. Other techniques and aspects are explained below.

Figure 1:
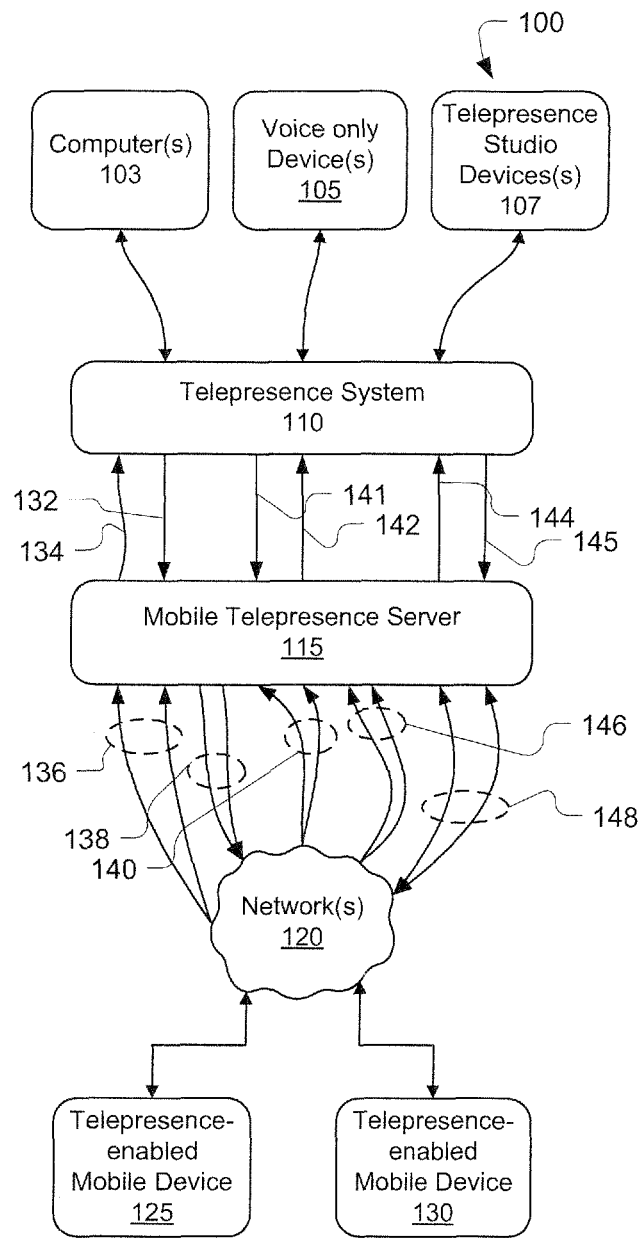
FIG 1 depicts a telepresence architecture with a telepresence system and server that intermediates between the system and a mobile device.
Figure 2:
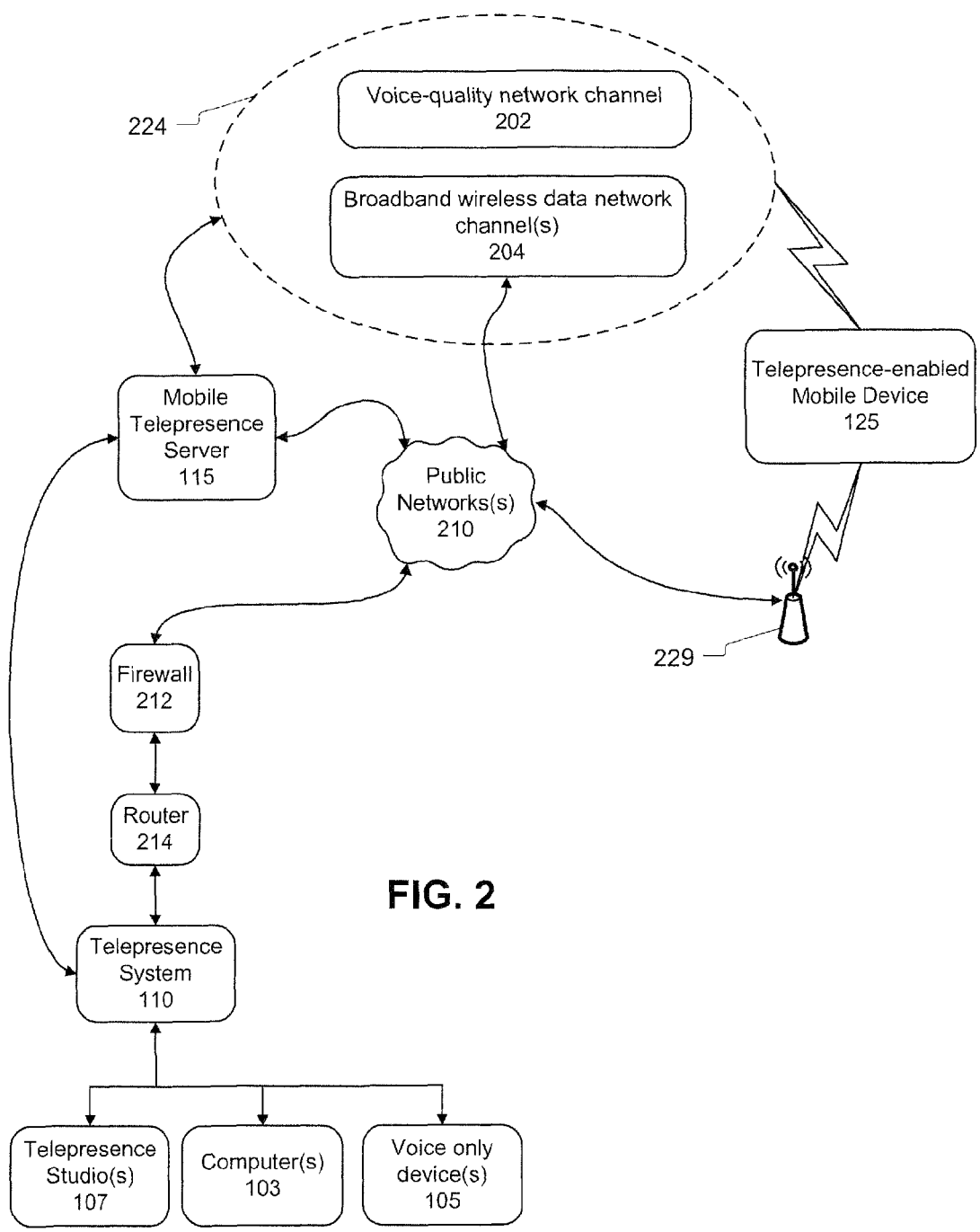
FIG 2 depicts elements of an example implementation of the FIG 1 architecture.

FIG 1 depicts a logical organization of an example telepresence architecture 100 in which elements described below can function (FIG 2 presents aspects of an example physical organization of such an architecture). A telepresence system 110 can be provided, for example, in a specially-designed room at a corporation or at a conference hosting service. Telepresence system 110 can interface devices provided in a telepresence studio, collectively represented by telepresence studio devices 107. Such devices can include a plurality of high definition video cameras, microphone arrays, high definition display devices, and devices to accept control commands from participants in a conference at that location. Telepresence system also can provide functionality to other devices, including voice-only devices 105 and computers 103. The characteristics of such devices generally will dictate what kinds of services can be provided by telepresence system 110 to them. For example, a computer with a large display, a good quality microphone and camera installation, and a fast network connection can have capabilties similar to that provided by devices in studio 107, although an environment in which the computer 103 generally will not be as carefully controlled as that of studio 107.

Telepresence system 110 interfaces with a mobile telepresence server 115 over one or more network connections, which can comprise public and provide networks, which can be interconnected through routers. For example, system 110 and server 115 can be connected using the Internet, and preferably system 110 and server 115 are connected using low latency and high bandwidth communication links, which provide capability to implement quality of service (QoS) techniques. Mobile telepresence server 115 communicates through a network(s) 120 with telepresence-enabled mobile devices 125 and 130 (for convenience, hereinafter identified as mobile devices). Network(s) 120 can comprise a plurality of physical networks or different networks at different times, as explained in further detail with respect to FIG 2.

Logical flows of data that will be described further below include data flows between mobile devices 125 130 and telepresence server 115. These data flows include video uplink 136 between devices 125 and 130, video downlink 138 from server 115 and each of devices 125 and 130, audio channel 148, and control uplink 140, which is representative of transmission of control commands and status information described below. Other data flows can include a secondary data uplink 146, which can be used, for example, in uplink of application data, such as a presentation, spreadsheets, and other data that may be a topic for discussion during a telepresence session. FIG 1 depicts an example where separate TCP or UDP flows can be provided for each device, and for each type of data being exchanged. For example, a separate UDP flow can be provided for each of devices 125 and 130 video uplink and for each downlink received by each of devices 125 and 130. Other embodiments can be provided in accordance with this description.

Similarly, logical flows of data between server 115 and telepresence system 110 can include video uplink 134, video downlink 132, audio uplink 142 and downlink 141 channel 142, and data uplink 144 and downlink 145. These identified communication uplinks and downlinks each can be implemented as separate flows, or can be implemented as a unified flow with elements that can be parsed by the respective recipient of the data. For example, separate UDP or TCP sessions can be made for each data type, or each uplink and downlink, or one UPD or TCP session for each telepresence occurring, or other implementations, as may be appropriate. Server 115 mediates between telepresence system 110 and mobile devices 125 and 130 to provide enhanced telepresence-like services to those devices.

In embodiments using TCP/IP, server 110 can terminate TCP sessions of mobile devices 125 and 130 and establish new TCP/IP sessions with telepresence system 110 on behalf of mobile devices 125 and 130.

FIG 2 depicts further aspects of an example implementation of architecture 100. FIG 2 depicts that mobile telepresence server 115 can have a connection to public network 210 and to a broadband wireless network 224, such as a cellular network, and by more particular example, a data-enabled network, such as GPRS, EDGE, CDMA-W, LTE, UMTS, and so on. Network 224 can implement a voice quality channel 202, which can be used to carry voice data between mobile device 125 and server 115 (device 130 not illustrated in FIG 2). Network 224 also comprises a data channel that here can be used for transmission of video data and other data, as described with respect to FIG 1, and below. Public network 210 also can couple with a local area network wireless access point (e.g., an IEEE 802.11 series access point). Device 125 can implement interfaces for both the cellular network and for the local area wireless network. Public Network 210 also can couple with a firewall 212, which in turn can communicate through a router 214 to telepresence system 110 (firewall 212 and router 214 can be implemented together, as well). Telepresence studio devices 107, computers 103, and voice-only devices 105 couple with telepresence system 110, as in FIG 1. Mobile telepresence server 115 also can couple directly with telepresence system 110, such as by the use of a dedicated communication link or leased line. Such linkages also can traverse firewall 212 and router 214, without traversing public network 210. Server 115 and system 110 can communicate over public network 210 using virtual private network technology.

Thus, FIG 2 depicts that a telepresence-enabled mobile device can have a capability to communicate over a plurality of wireless communication networks, which can have different bandwidth. For example, with a strong link to an IEEE 802.11G or N base station, mobile device 125 typically would have access to more bandwidth than what would generally be available over a cellular network connection. Further, all such wireless networks generally are more subject to variation in bandwidth and latency than a wired network, and especially a voice-quality network.

Therefore, a telepresence-enabled mobile device should be provided with a capability to beneficially use increased bandwidth, when available, and be tolerant of variation in bandwidth and latency.

When using a local area wireless network connection, data typically would travel over a network of an Internet Service Provider (ISP), before entering public network 210, and arriving at server 115. Both cellular network 224 and public network 210 can implement IP addressing for data communications, as well as IP addressing for both voice and data communications. Session Initiation Protocol (SIP) can be used as a signaling mechanism between server 115 and mobile device 125, as well as between server 115 and system 110. Various encapsulation layers can be provided for commmunications between server 115 and device 125, such as using ATM-type QoS for the voice quality network 202 portion.

QoS can be implemented for data channel 204 based on what type of network technology is employed, and can include technology, such as MPLS or DiffSery for QoS implementation. Further explanation of server 115 and device 125 is provided following the example operational explanation provided with respect to FIGS. 3-7.

FIG 3 depicts aspects of a method that can be implemented at device 125 for initiating a telepresence session with telepresence studio 107, using server 115. FIG 3 depicts that device 125 can receive a request to establish a telepresence session, such a request can be initiated responsive to input. Device 125 can sense or otherwise receive information about current operating conditions, including a battery status, which network is currently being used for communication, whether an alternative network is available, and what overall signal strength is attributable to the current network. Based on these operating conditions, and other considerations, such as user preferences, mobile device 125 can establish (356) settings to be used at a start of the telepresence session. These settings can include selection of what data mobile device 125 is to receive, such as which video elements, if any (as explained below.) Mobile device 125 can request initiation (356) of a telepresence session of server 115. Such request can be made before, after, or concurrently with determining what settings are to be initially used for the session. The initially determined settings are transmitted (358) to telepresence server 115. Thereafter, a telepresence session can be conducted (359), which can comprise receiving (360) telepresence data, which can include video and audio data and performing (361) video and audio respectively on a display and a speaker based on such received data.

FIG 4 depicts example aspects of a dynamically updating telepresence functionality for providing enhanced telepresence to mobile devices. Device 125 monitors (401) status and other parameters of relevance to the telepresence session. Such status and parameter information can include battery information, network access charges, and availability of a faster network, for example. Device 125 also can sense 403 environmental conditions, such as include lighting conditions that can affect video quality transmitted from mobile device 125.

Responsive to one or more of the status and parameter information, device 125 can determine (405) to adjust aspects of the incoming audio and/or video streams. Such adjustment is accomplished by commanding server 115 to adjust such streams appropriately using a control command determined (407) by device 125. Such determinations and control command formation can be described more generally as a determination of a desired composition of telepresence session data. Such control command is transmitted to server 115 (which implements the command as explained below). Device 125 also can transmit audio and video in the session, and device 125 thus determines what such content comprises. For example, in some embodiments, elements of a presentation can be transmitted with video of a user of device 125. Other aspects include that the video content can be altered to increase the quality of the video. One such aspect can include adjusting for changing lighting conditions through contrast control techniques. Another aspect can include using face recognition technology to keep a face of the user centered in the video stream that is transmitted. These aspects are represented by adjustment (413) of the captured video streams.

Other selections that affect the content transmitted from device 125 include whether one or more of a front camera and a back camera are selected for operation (415), in devices that have multiple cameras, and presentation content to be made available (417) from device 125. The content thus processed and otherwise made available is transmitted (419) from device 125 to server 115.

Figure 5:
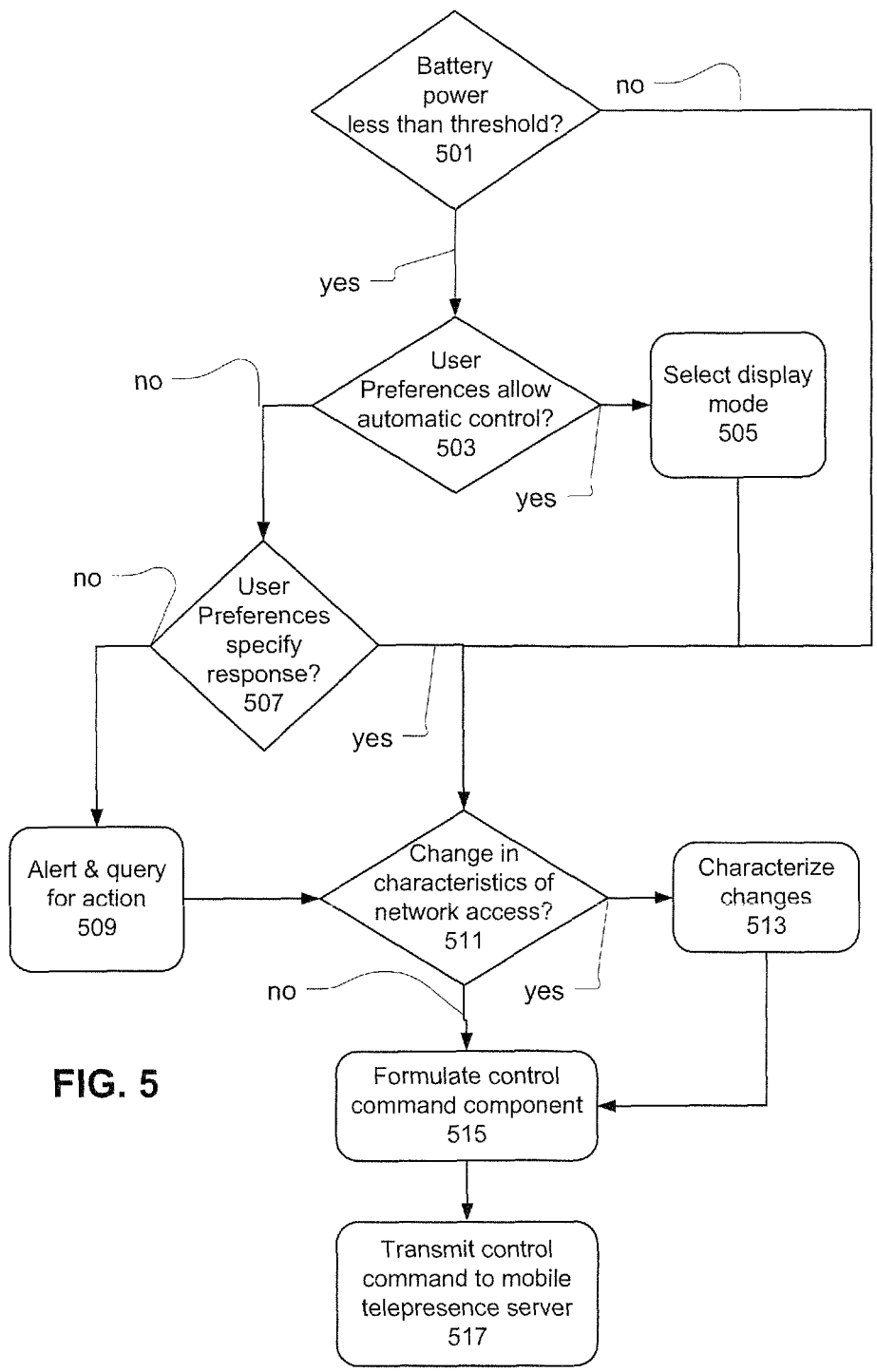
FIG 5 depicts further aspects of dynamic adjustment.

In some aspects, a telepresence experience on mobile device 125 is enhanced by dynamic controls for changing device status and environment conditions while a telepresence session proceeds. Such dynamic control of an ongoing telepresence session can include a real-time exchange of telepresence session settings, status information that allows dynamically changing such settings, as well as both settings and status information. In this context, real-time exchange of telepresence-related data, such as control or status information exchanges, provides a capability to adjust telepresence session data transmitted to the mobile device as a telepresence session continues. FIG 5 depicts examples of such dynamic control that can occur during a telepresence session. In one aspect, device 125 monitors (501) whether a battery that is powering device 125 has less than a threshold of power left, and if so, then user preferences stored at device 125 are checked (503) to determine whether the device is permitted to automatically adjust elements of the telepresence to conserve power. If such preference information allows the device to make automatically adjustments, then device 125 selects (505) a reduced power consumption video display mode. In one example, selecting a lower quality video display mode can save device battery life in one or more ways. One way is that radio power can be conserved, and another way is that display power consumption also can be reduced by reducing one or more of resolution, frame rate, or an amount of display area occupied by video. Examples of screen arrangements that implemented a tiered reduction of power consumption are provided in FIGS. 10-13.

If user preferences do not permit automatic adjustments, then a method according to FIG 5 can further include determining (507) whether those user preferences specify a response to the battery power threshold comparison. For example, the user preferences can indicate an order of power reducing activities to implement. The user preferences also can indicate that no power reducing activities are to be implemented. Still further, the method can include alerting (509) a user of device 125 of the power threshold condition and querying (509) the user for a response, or for an indication that the device is to conduct power conservation activities.

If no battery power threshold concern is indicated, or otherwise after the battery power threshold concern has been processed, then changes in characteristics of network access can be detected (511). Such changes can be characterized (513); such characterization can include that a higher speed network is available, or that a network with better signal strength or other desirable characteristics is available. These changed network characteristics and the battery power aspects can then be used in formulating a control command component (515), which is transmitted (517) to server 115. Such control command component can indicate changes to the video stream being transmitted from server 115 for reception by device 125.

Depending on the circumstances, either the battery power condition, the network condition, neither, or both can be used in formulating a control command. The depicted method also can include not transmitting any control command, in the absence of changes, or depending on user configuration or preference information.

Figure 6:
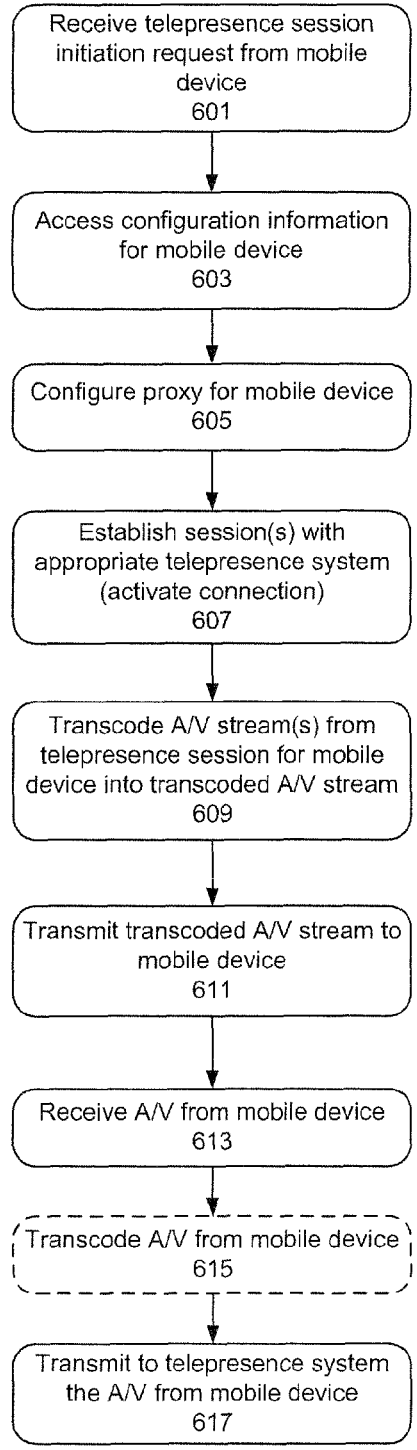
FIG 6 depicts aspects of a method that can be implemented at a server intermediating between a mobile device and a telepresence system as shown in FIG 1.

Now turning to FIG 6, there is depicted aspects of a method that can be implemented on telepresence server 115. The depicted method includes receiving (601) a telepresence session initiation request from mobile device 125. Configuration information for mobile device 125 can be accessed, from a storage local to server 115, accessed from the session initiation request from device 125, or both. For example, if server 115 has previously handled telepresence sessions for device 125, then that device can have a profile registered with server 115, which also can include user preference information. The session request can include identification of a particular telepresence system with which device 125 is to communicate. The server configures (605) itself to function as a proxy between device 125 and the telepresence system (e.g., system 110).

Server 115 also establishes one or more connections with telepresence system 110, such as TCP sessions for one or more of video, audio, and presentation data, as can be indicated in the configuration information provided from device 125.

During the ensuing telepresence session, server 115 functions to transcode one or more of audio and video between high definition formations, with potentially a number of separate streams for a number of cameras located at one or more sites. In a contrasting example, a telepresence studio can receive High Definition (HD) video feeds from a number of other participating telepresence studios. However, to conserve bandwidth and radio usage, server 125 can receive these high definition streams, and transcode (609) them into a selected composite format, or otherwise cull feeds that are not presented indicated for reception. For example, device 125 can indicate a total screen resolution, and a partition of the screen space between an active speaker in the conference and video feeds from other sites. A frame rate for the composite video stream also can be indicated, which can be different from the native frame rate of the full HD feeds.

With respect to audio, codecs can be changed, if desired. However, in some examples, the audio can be transmitted at full resolution. As depicted in FIG 2, the audio also can be transmitted over a separate voice quality channel, using one or more codecs provided for use on that channel.

The transcoded video/audio is transmitted (609) to device 125. Audio and/or video streams also can be received (613) from device 125, as can presentation content and other data. In turn, these received video/audio streams can be transcoded, if desired. For example, video resolution can be upscaled, and/or filtered. The audio, video and/or data can then be transmitted by server 115 to system 110.

Figure 7:
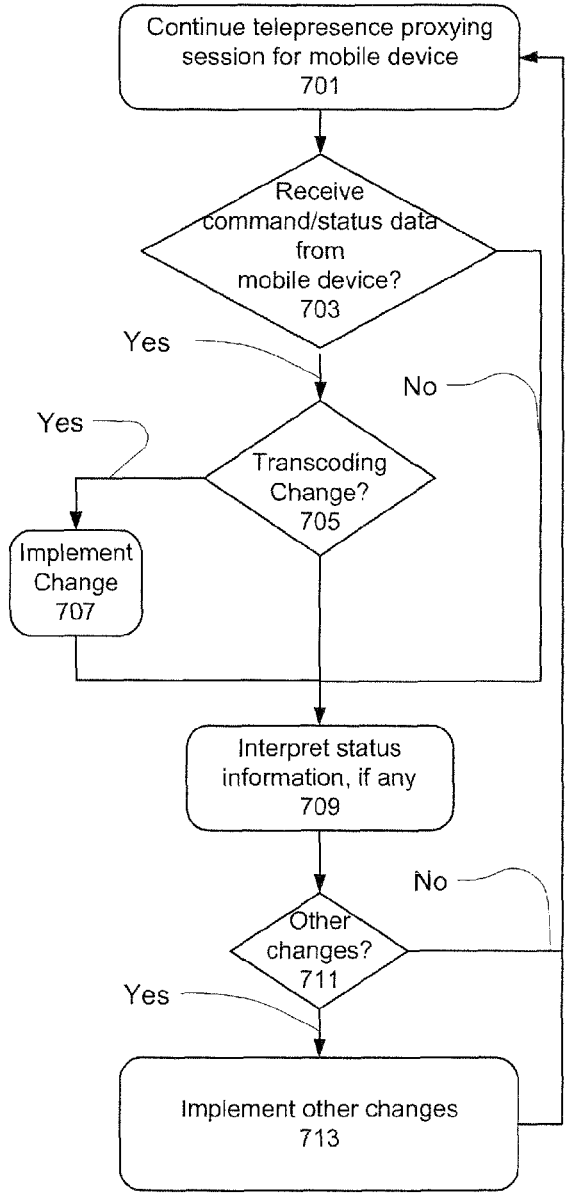
FIG 7 depicts a further method that can be implemented at such a server, for implementing dynamic adjustments of data sent to mobile devices, responsive to control commands.

As described above, device 125 can send control commands during a telepresence session to server 115. FIG 7 depicts aspects of an example of how server 115 can process such control commands. In FIG 7, a telepresence session is continued (701) by proxying between system 110 and device 125. FIG 7 depicts that server 115 detects (703) reception of a command and/or status data from device 125. Server 115 determines whether the command indicates, or the status data dictates, a change (705) to current transcoding settings. If so, such change is implemented to the a/v stream(s) from server 115 to device 125. If not, then other status information provided from device 125 can be interpreted (709). For example, rather than implementing an explicit command from device 125, server 115 can interpret status information from the mobile device and select an appropriate format change, such as one indicated by a ranked ordering of quality versus bandwidth consumption video compositions. Other examples can include a change in audio codec to increase or decrease quality (determination (711) and implementation (713) of other changes). The depicted method ultimately returns to continuing proxy (701) between system 110 and device 125 by server 115.

Figure 8:
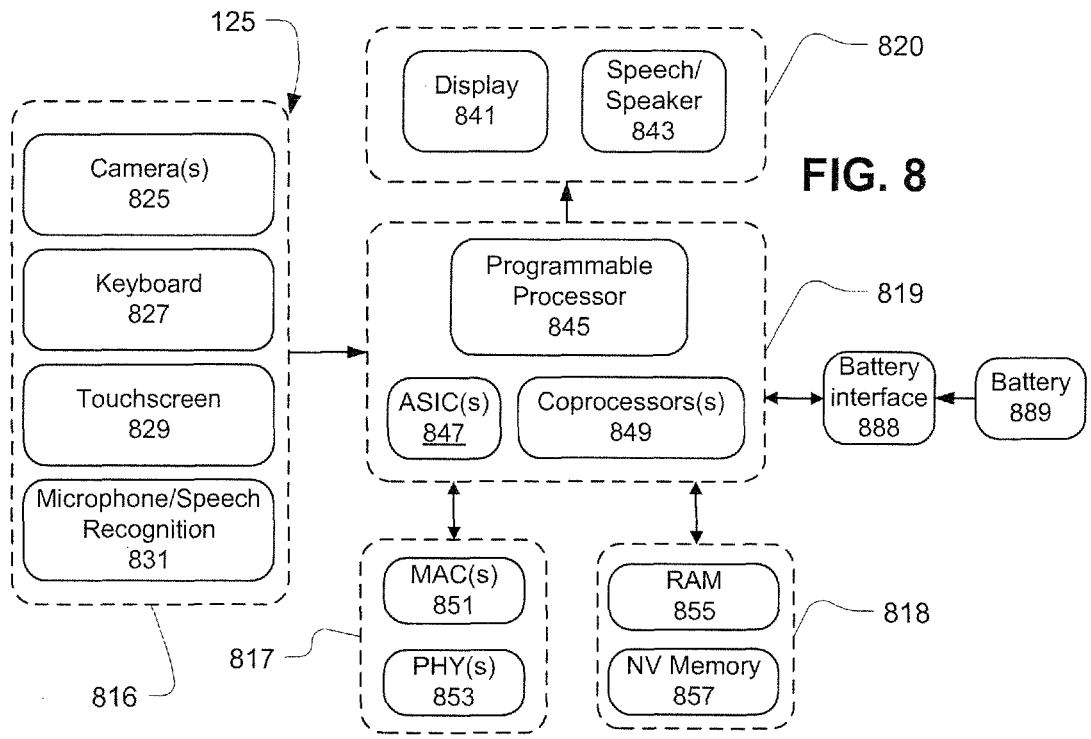
FIG 8 depicts an example organization of a mobile device.

Device 125 described above can be implemented according to the example of FIG 8, described below. For example, device 125 can have a variety of components by which input can be received (collectively identified as user interface 816), including a camera 825, a keyboard 827, a touch screen 829, and a microphone that can be used for speech recognition 831, for example. These ways of receiving input can be processed with processing resource 819 that can be comprised of a plurality of components, such as a programmable processor 845, one or more Application Specific Integrated Circuits (ASICs) 847, as well as other co-processors 849. For example, an ASIC or co-processor can be provided for implementing graphics functionality, encryption and decryption, audio filtering, and other such functions that often involve many repetitive, math-intensive steps.

Processing resources 819 also can interface with one or more network interfaces 817, each of which can be comprised of one or more Media Access Controllers (MACs) 851, which in turn interface with physical layers 853. Such MACs 851 also can function to monitor heir respective physical channels, to determine what kind of signal quality and power is being used to communicate on its channel. That information can be provided to software running on processing resources 819, for use in making determinations according to the methods described above.

Processing resource 819 also can interface with a memory resource 818 which can be comprised of a plurality of memories, including a RAM 855, and a non-volatile memory 857, which can be implemented with one or more of Flash memory, PROM, EPROM, and the like. Processing resource 819 also can interface with output 820 components, which can include a display 841, which can be used for performing video or still images, and a speaker 843, which can be used for text to speech and for performing audio.

Processing resource 819 also can receive information from a battery interface 888, which can monitor conditions of a battery 889, such as charge remaining, and a rate of discharge. This information can be used as inputs into the methods for selecting telepresence session characteristics and effecting a telepresence session based on those characteristics, in accordance with the above description.

Figure 9:
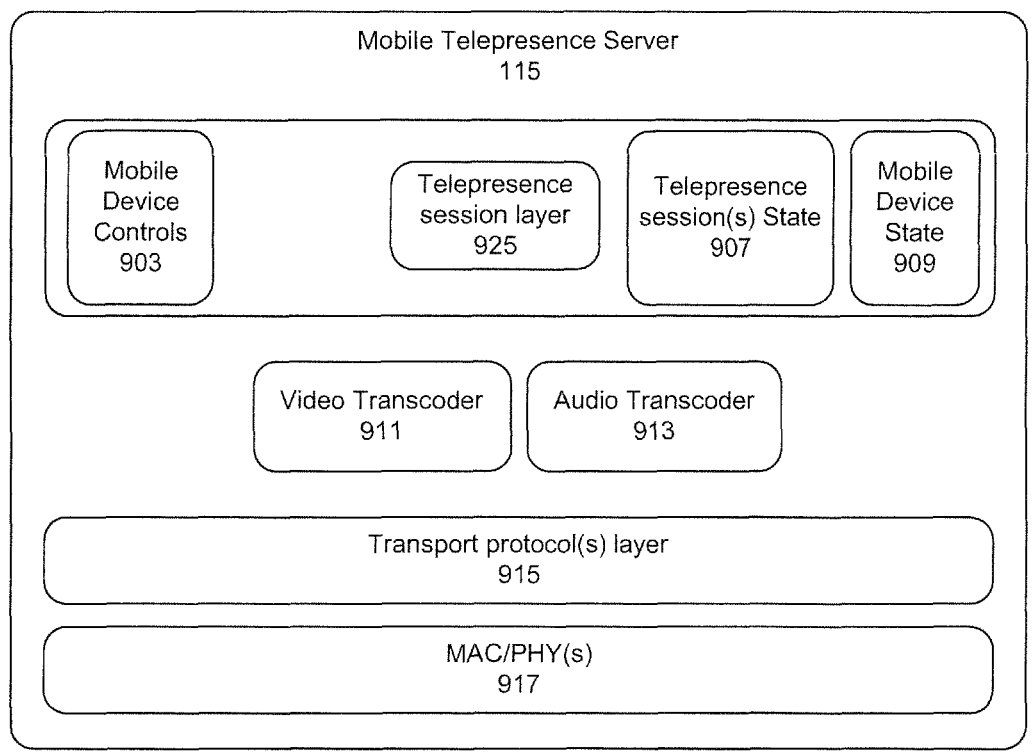
FIG 9 depicts an example organization of a server that can function as the server intermediating between mobile devices and the telepresence server of FIG 1.

FIG 9 depicts an example organization of telepresence server 115. Telepresence server 115 can include a plurality of MAC/Physical Layers (PHYs) for interfacing with a variety of networks, and can for example include fiber and copper based Ethernet connections to a switch, which in turn communicates with a router. A transport protocol layer 915 manages transport layer activities for telepresence sessions and can implement a TCP protocol, for example. Telepresence server 115 can implement a video transcoder 911 and an audio transcoder 913. Video transcoder 911 can implement functions including changing a resolution of a plurality of images and compositing images. For example video transcoder 911 can receive a plurality of high definition video streams over MAC/PHY 917 and convert those streams into lower resolution streams and composite the lower resolution streams into a new video stream where the lower resolution streams each occupy a screen portion of the new video stream. Similarly, audio transcoder 913 can change codecs used in encoding audio. For example, codecs can be changed between any of International Telecommunications Union (ITU) Recommendations G.721, G.722, G.729, and so on.

A variety of telepresence session state and other information can be used in controller activities conducted by video transcoder 911 and audio transcoder 913. For example, a telepresence session layer 925 can manage session state 907 for telepresence sessions in which a mobile device uses server 115 as a proxy to a telepresence system (e.g., system 110). For example, such maintained state can include current video streams being sent to and received from mobile device 125, as well as other data, such as a presentation that can be sourced from remote device 125. Server 115 also can maintain a store of information about devices that have used and/or are using server 115 for telepresence, as represented by mobile device state 909, which can include more permanent data such as screen resolution, user preferences, network capabilities and so on. Other more dynamic information can be maintained in mobile device state 909 store as well, including information such as battery status and current network being used by such devices (e.g., device 125). Such state information can be used in selecting appropriate video formats that will be used in controlling video transcoder 911 to produce a video stream appropriate for each mobile device. Examples of screen arrangements are described below.

FIG 10 depicts a roster view that can be used both at a telepresence session initiation and in bandwidth and power conserving modes of operation. FIG 10 depicts that a roster view can include thumbnail displays (1001, 1007, 1013) either of static images or of video sequences of the participants (e.g., people or sites) in the telepresence session. In one example, the roster view can begin with video of each site, and reduce frame rate of the video as one intermediate step of resource intensiveness reduction, and switch to a static or infrequently updated image sequence as a further step of reduction. Other portions of the roster view can include information about the session participants (1003, 1009, 1015). Respective buttons (1005, 1011, 1017) can be provided to allow selection of video from any of the sites in the roster view. In other examples involving a touch sensitive display, any information such as the thumbnail or the information can be selected to focus on a particular participant, and a separate button for that purpose need not be provided. As described below, non-touch screen implementations can provide an overlay of numbers on thumbnails that indicate a key to press in order to focus on each participant. An area for a keyboard 1021 can be provided, if desired. Such keyboard 1021 can be virtual or physical.

FIG 11 depicts a plurality of thumbnails 1101-1106 displayed to occupy most of an available screen. This mode can be indicated as a control command from device 125 to server 115. Numerals overlayed on the respective thumbnails allow selection of a thumbnail to further expand the video from that site.

Selection of a particular thumbnail can result in the screen depicted in FIG 12 here, a larger portion of the screen is devoted to a particular participant, a return button 1205 can be provided, which can return the display to that of FIG 11.

A still further example screen organization is depicted in FIG 13, wherein one or more thumbnails 1304 and 1305 are presented, which can include, for example, a video of an active speaker or speakers. These thumbnails can be provided with overlayed numbers, which function as described with respect to FIG 11. A slide show portion 1307 can be provided, which can be used for display of slides presented by a remote location.

Keyboards 1113, 1203, and 1309 are depicted, and as described with respect to FIG 10 can be implemented virtually or physically. In some cases, the keyboard can be omitted, or can appear when an indication of its need is inputted.

The screen changes exemplified by FIGS. 10-13 preferably are implemented by control commands sent from device 125 to server 115, which changes the data sent to device 125 responsively. This approach is in contrast to the device continuing to receive a superset of the data that can be displayed and locally selecting from that superset a smaller set of data for display.

Figure 14:
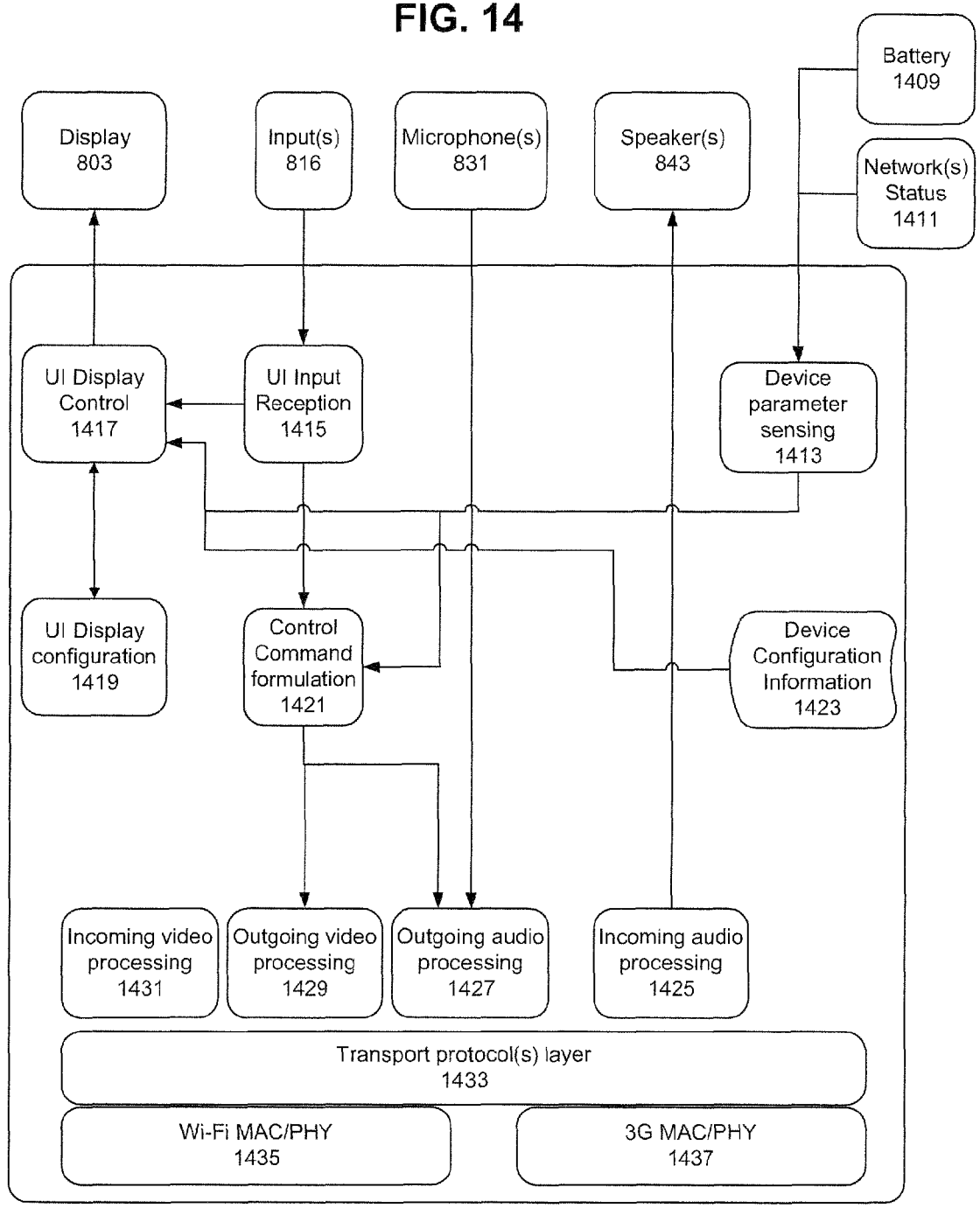
FIG 14 depicts a functional module organization of a mobile device according to these examples.

FIG 14 depicts a functional module architecture of an example of device 125. Device 125 can include both a local area network wireless MAC/PHY (e.g., Wi-Fi) 1435 and a broadband MAC/PHY (e.g., 3G MAC/PHY 1437). Each of these network interfaces can communicate through one or more transport protocol layers with functional modules implemented in device 125. Such functional modules can include incoming video processing 1431, outgoing video processing 1429, outgoing audio processing 1427 and incoming audio processing 1425. In some examples, e.g., if using a broadband network, such as through 3G MAC/PHY 1437, audio can be carried on a voice grade channel logically separate from data representative of video sent from and received by device 125.

Other modules include a control command formulation module 1421, which receives input from device parameter sensing module 1413, and from UI input reception processing 1415. Control command formulation can control outgoing video and audio processing 1429 and 1427. Its control commands also can be transmitted through the depicted network layers to server 115. A UI display configuration module 1419 can control a UI display controller 1417, which also can receive configuration information from a device configuration store 1423. Outgoing video processing also can implement functionality such as outgoing video freezing during lapses in network connectivity or loss of focus detected. Such functionality can be overridden by user preferences, or selectively enabled.

Device parameter sensing module 1413 can receive information concerning or otherwise monitor status of network status 1411 and battery 1409. Incoming audio processing 1425 can output audio to speaker 843. Microphone 831 can output captured audio to outgoing audio processing 1427. Inputs can provided through any of the input devices depicted in FIG 8 and identified generally as input devices 816.

Figure 15:
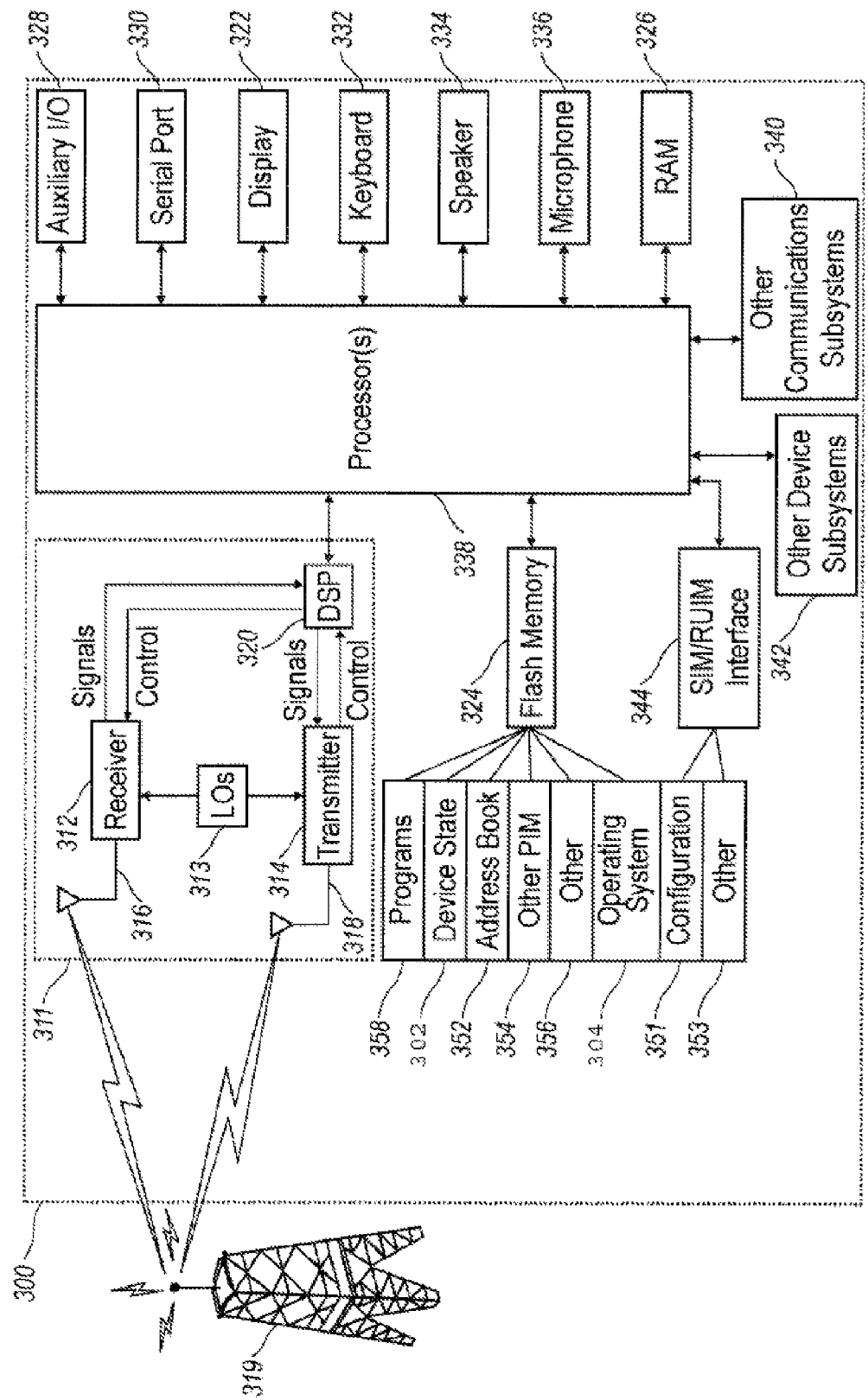
FIG 15 depicts further aspects of devices that can be used in systems and methods according to this description.

Further explanation concerning a device 125 and a system environment in which it can operate is presented in relation to the block diagram depicted in FIG 15. The mobile electronic device 300 can include a microprocessor module 338 that can control the operation of the mobile electronic device 300. A communication subsystem 311 can perform transmission and reception operations with a wireless network 309 or with a wired network (not shown). For example, the subsystem 311 can include a receiver 312, a local oscillator 313, a transmitter 314, a receive antenna 316, a transmit antenna 318 and a digital signal processor 320. The microprocessor module 338 further can be connected with an auxiliary input/output (I/O) subsystem 328, which can be connected to the mobile electronic device 300. In at least one embodiment, the microprocessor module 338 can be connected to a serial port 330 (for example, a Universal Serial Bus port), which can allow for communication with other devices or systems. The display 322 can be connected to the microprocessor module 338 to allow for displaying of information to an operator of the mobile electronic device 300. When the mobile electronic device 300 is equipped with a keyboard 332, the keyboard 332 can also be connected with the microprocessor module 338. The mobile electronic device 300 can also include a speaker 334, a microphone 336, random access memory (RAM) 326, and flash memory 324, all of which can be connected to the microprocessor module 338. Other similar components can also be provided on the mobile electronic device 300 and optionally connected to the microprocessor module 338. Other communication subsystems 340 and other communication device subsystems 342 are generally indicated as being functionally connected with the microprocessor module 338, as well. An example of a communication subsystem 340 is a short range communication system, such as a BLUETOOTH® communication module or a WI-FI® communication module (a communication module in compliance with any of the IEEE 802.11 set of protocols) and associated circuits and components.

The microprocessor module 338 is able to perform operating system functions and enables execution of programs on the mobile electronic device 300. In some embodiments, not all of the above components can be included in the mobile electronic device 300. For example, in at least one embodiment the keyboard 332 is not provided as a separate component and is displayed as required on a dynamic touch display. In an embodiment having a dynamic touch display, the keyboard 332 can be displayed as a touchscreen keyboard. A touchscreen module can be incorporated in such an embodiment such that it is in communication with the microprocessor 338. When inputs are received on the touchscreen keyboard, the touchscreen module can send or relay messages corresponding to those inputs to the microprocessor 338.

The auxiliary input-output (I/O) subsystem 328 can take the form of a trackball navigation tool, a thumbwheel, a navigation pad, a joystick, touch-sensitive interface, or other I/O interface. Other auxiliary I/O subsystems can include external display devices and externally connected keyboards (not shown). While the above examples have been provided in relation to the auxiliary I/O subsystem 328, other subsystems capable of providing input or receiving output from the mobile electronic device 300 are considered within the scope of this disclosure. Other keys can be placed along the side of the mobile electronic device 300 to function as escape keys, volume control keys, scrolling keys, power switches, or user programmable keys, and can likewise be programmed accordingly.

Furthermore, the mobile electronic device 300 can be equipped with components to enable operation of various programs, as shown in FIG 10. For example, the flash memory 324 can be enabled to provide a storage location for an operating system 304, device programs 358, and data. The operating system 304 is generally configured to manage other device programs 358 that are also stored in the memory 324 and are executable on the processor 338. The operating system 304 can honor requests for services made by device programs 358 through predefined program interfaces. More specifically, the operating system 304 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 304 through any suitable user interface. While in one example the operating system 304 can be stored in flash memory 324, the operating system 304 in other embodiments can be stored in read-only memory (ROM) or another similar storage element (not shown). As those skilled in the art will appreciate, the operating system 304, device program 358 or parts thereof can be loaded in RAM 326 or other volatile memory.

In one embodiment, the flash memory 324 can contain programs 358 for execution on the mobile electronic device 300, including—but not limited to—an address book 352, a personal information manager (PIM) 354, and a device state 302. Furthermore, programs 358 and other information 356 including data can be segregated upon storage in the flash memory 324 of the mobile electronic device 300.

When the mobile electronic device 300 is enabled for two-way communication within the wireless communication network 309, it can send and receive messages from a mobile communication service. Examples of communication systems enabled for two-way communication include, but are not limited to, a General Packet Radio Service (GPRS) network, a Universal Mobile Telecommunication Service (UMTS) network, an Enhanced Data for Global Evolution (EDGE) network, a Code Division Multiple Access (CDMA) network, High-Speed Packet Access (HSPA) networks, Universal Mobile Telecommunication Service Time Division Duplexing (UMTS-TDD) networks, Ultra Mobile Broadband (UMB) networks, Worldwide Interoperability for Microwave Access (WiMAX) networks, Long Term Evolution (LTE) networks and other systems using other suitable protocols or standards that can be used for carrying data and voice, or just data or voice. For the systems listed above, the mobile electronic device 300 can require a unique identifier to enable the mobile electronic device 300 to transmit and receive messages from the communication network 309. Other systems may not require such identifying information. GPRS, UMTS, and EDGE use a Subscriber Identity Module (SIM) in order to allow communication with the communication network 309. Likewise, most CDMA systems use a Removable User Identity Module (RUIM) in order to communicate with the CDMA network. The RUIM and SIM card can be used in multiple different mobile electronic devices 300. A SIM/RUIM interface 344 located within the communication mobile electronic device 300 allows for removal or insertion of a SIM/RUIM card (not shown). The SIM/RUIM card features memory and holds key configurations 351, and other information 353 such as identification and subscriber related information. With a properly enabled mobile electronic device 300, two-way communication between the mobile electronic device 300 and communication network 309 is possible. It is also understood that the mobile electronic device 300 can be configured to communicate in asynchronous networks, such as when two or more mobile electronic devices communicate without the assistance of fixed network equipment. If the mobile electronic device 300 is enabled as described above or the communication network 309 does not require such enablement, the two-way communication enabled mobile electronic device 300 is able to both transmit and receive information from the communication network 309. The transfer of communication can be from the mobile electronic device 300 or to the mobile electronic device 300. To communicate with the communication network 309, the mobile electronic device 300 in the presently described example, as noted earlier, can be equipped with a transmit antenna 318 for transmitting messages to the communication network 309. Likewise the mobile electronic device 300 in the presently described example is equipped with a receive antenna 316 for receiving communication from the communication network 309. In another arrangement, these antennae 316, 318 are combined into a single antenna (not shown). As one skilled in the art would appreciate, the antenna or antennae 316, 318 can be externally mounted on or internally mounted in the mobile electronic device 300.

Aspects described above can be implemented as computer executable code modules that can be stored on computer readable media, read by one or more processors, and executed thereon. In addition, separate boxes or illustrated separation of functional elements of illustrated systems does not necessarily require physical separation of such functions, as communications between such elements can occur by way of messaging, function calls, shared memory space, and so on, without any such physical separation. More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

We claim:

1. A method for telepresence at a mobile device, comprising:
   determining a desired composition of telepresence session data to be provided to the mobile device from a remote server, based on a plurality of high-definition video sources provided to the server, the determining at least in part based on a real-time availability of resources to the mobile device, the resources comprising current status of a battery powering the mobile device and bandwidth available over a wireless network;
   transmitting information representative of the desired composition of telepresence session data to the remote server;
   receiving the telepresence session data through an interface to the wireless network; and
   performing portions of the telepresence session data on a display and through an audio speaker at the mobile device.

2. The method of claim 1, wherein the determining of the desired composition of the telepresence session data comprises determining a desired composition of a video stream, based on one or more of the plurality of high-definition video sources, to be provided by the remote server to the mobile device.

3. The method of claim 1, wherein the determining further comprises accepting an input at the mobile device and interpreting the input as a selection of one or more of the plurality of high-definition video sources, and using that selection in determining the desired composition of telepresence session data.

4. The method of claim 1, wherein the determining of the desired composition of telepresence session data comprises available power and network bandwidth resources of the mobile device.

5. The method of claim 1, wherein the determining comprises selecting a video stream composition requiring higher bandwidth upon detection of availability of a higher bandwidth wireless network connection.

6. The method of claim 5, wherein the determining comprises selecting a video stream composition requiring lower bandwidth upon detection of lack of availability of the higher bandwidth wireless network connection.

7. The method of claim 1, wherein the determining comprises selecting a format for the desired composition from a list of available formats ordered according to resource consumption rate to receive video in that format.

8. The method of claim 1, wherein the determining comprises selecting a video stream composition from video stream compositions comprising a roster view, an active speaker view, and a thumbnail matrix view.

9. The method of claim 1, wherein the determining is further based on one or more of a resolution of the display at the remote device, a size of the display, and availability of video and audio codecs at the remote device.

10. A server-based method for providing telepresence-like capabilities to mobile devices, comprising:
making a connection to a telepresence system that receives high-definition video from cameras during a telepresence session;
receiving telepresence session configuration information updates from the mobile device during the telepresence session;
receiving a plurality of video streams from the telepresence system;
determining characteristics of telepresence session information to be provided to the mobile device based on accessed mobile device telepresence session configuration information, representative of accepted configuration information updates;
forming the telepresence session information to be provided to the mobile device according to the determined characteristics; and
transmitting the telepresence session information for reception by the mobile device.

11. The method of claim 10, wherein the forming of the telepresence session information to be provided to the mobile device comprises selecting a video composition format from available formats comprising a roster view, an active speaker view, and a thumbnail matrix view.

12. The method of claim 10, the determined characteristics comprising characteristics for a video stream comprising one or more of a selection from the received video streams, a frame rate, and a resolution.

13. A mobile telepresence-enabled device, comprising:
a display;
a network interface;
a memory resource;
processing resources coupled with the memory resource, the network interface, the display, for operation under battery power, and comprising one or more modules configured for
monitoring status of a battery providing the battery power and status of a network to which the network interface communicates,
controlling elements of a telepresence session involving the device by using one or more of the status of the battery and of the network in formulating control commands to a network-based server, the control commands indicating changes in telepresence session data that is to be transmitted from the server to the device, and
controlling the display based on the data that is received from the server.

14. The device of claim 13, further comprising a video camera, and wherein the one or more modules of the processing resources further are for encoding video from the video camera and transmitting the encoded video to the server.

15. The device of claim 13, wherein the one or more modules of the processing resources further are for detecting a face captured on video taken from a video camera provided with the device and maintaining an approximately fixed position of the face in a video stream outputted from the device.

16. The device of claim 13, wherein the one or more modules of the processing resources further are for adjusting contrast of video taken from a video camera provided with the device.

17. The device of claim 13, further comprising a first video camera provided to capture video from a side of the device on which the display is provided, and a second video camera provided to point from an opposite side of the device, wherein the one or more modules further comprise an input module for detecting a selection indicative of an active camera selection of either the first video camera or the second video camera.

18. A system for telepresence at mobile devices, comprising:
a telepresence system for connecting over a comparatively high-speed local area network connection with a telepresence studio, the telepresence system communicating through a firewall with one or more wide area networks;
a server, capable of communication with the telepresence system through the firewall and
over the one or more wide area networks; and
a mobile device capable of communication with the server, wherein the server and the mobile device are configured for mutual interoperation to dynamically adjust video streamed from the server to the mobile device, responsive to control commands provided by the mobile device to the server.

19. The system of claim 18, wherein the control commands are formed based on real-time status sensed by the mobile device of one or more of battery life and network capability.

20. The system of claim 18, wherein the control commands are formed based on real-time status sensed by the mobile device of one or more of battery life and network capability, and on one or more of mobile device screen resolution, available video codecs and available audio codecs.

21. The system of claim 18, wherein the control commands are formed based on inputs to the mobile device.

22. The system of claim 18, wherein the mobile device comprises two or more video cameras, and wherein the mobile device is further configured for transmitting, to the server, video captured by a selected video camera from the two or more video cameras.

23. The system of claim 18, wherein the mobile device comprises a plurality of video cameras, and wherein the mobile device is further configured for transmitting, to the server, video captured by one of the plurality of video cameras that is selected by a control command sent from the server to the mobile device.

24. A computer readable medium storing computer executable instructions for performing a telepresence method at a mobile device, comprising:
  determining a desired composition of telepresence session data to be provided to the mobile device from a remote server, based on a plurality of high-definition video sources provided to the server, the determining at least in part based on a real-time availability of resources to the mobile device, the resources comprising current status of a battery powering the mobile device and bandwidth available over a wireless network;
  transmitting information representative of the desired composition of telepresence session data to the remote server;
  receiving the telepresence session data through an interface to the wireless network; and
  performing portions of the telepresence session data on a display and through an audio speaker at the mobile device.

* * * * *